United States Patent
Kugimoto et al.

(10) Patent No.: US 11,732,118 B2
(45) Date of Patent: Aug. 22, 2023

(54) RESIN COMPOSITION, MODIFIER, AND RESIN COMPOSITION INCLUDING THE MODIFIER

(71) Applicant: TOSOH CORPORATION, Shunan (JP)

(72) Inventors: Daisuke Kugimoto, Yokkaichi (JP); Koki Kamiya, Yokkaichi (JP); Shingo Kouda, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 75 days.

(21) Appl. No.: 17/401,515

(22) Filed: Aug. 13, 2021

(65) Prior Publication Data

US 2022/0049075 A1  Feb. 17, 2022

(30) Foreign Application Priority Data

Aug. 17, 2020 (JP) ................... 2020-137634

(51) Int. Cl.
   *C08L 23/06* (2006.01)
(52) U.S. Cl.
   CPC ......... *C08L 23/06* (2013.01); *C08L 2205/025* (2013.01); *C08L 2205/035* (2013.01); *C08L 2207/062* (2013.01); *C08L 2207/066* (2013.01); *C08L 2207/20* (2013.01)
(58) Field of Classification Search
   CPC ............. C08L 23/0853; C08L 23/0869; C08L 2205/025
   See application file for complete search history.

(56) References Cited

U.S. PATENT DOCUMENTS

| | | | | |
|---|---|---|---|---|
| 4,714,728 | A * | 12/1987 | Graham | C08F 8/44 524/460 |
| 2003/0027007 | A1 * | 2/2003 | Wieczorek, Jr. | C09J 123/0869 428/522 |
| 2006/0254575 | A1 | 11/2006 | Velazquez et al. | |
| 2007/0255007 | A1 | 11/2007 | Dean | |
| 2010/0069562 | A1 | 3/2010 | Dean | |
| 2010/0144952 | A1 | 6/2010 | Dean | |
| 2010/0144953 | A1 | 6/2010 | Dean | |
| 2014/0079935 | A1 | 3/2014 | Broyles | |
| 2018/0228209 | A1 * | 8/2018 | Tang | B01D 53/02 |
| 2019/0002677 | A1 | 1/2019 | Haley et al. | |
| 2019/0300763 | A1 | 10/2019 | Kawato et al. | |
| 2022/0106480 | A1 * | 4/2022 | Kugimoto | B29C 48/92 |

FOREIGN PATENT DOCUMENTS

| | | |
|---|---|---|
| CN | 104364309 A | 2/2015 |
| CN | 108949046 A | 12/2018 |
| EP | 0347794 A1 | 12/1989 |
| JP | 2001-220473 A | 8/2001 |
| JP | 2002-241548 A | 8/2002 |
| JP | 2003-301077 A | 10/2003 |
| JP | 2004-182957 A | 7/2004 |
| JP | 2004-231772 A | 8/2004 |
| JP | 2005-23190 A | 1/2005 |
| JP | 2008-38142 A | 2/2008 |
| JP | 2009-535452 A | 10/2009 |
| JP | 2012-24960 A | 2/2012 |
| JP | 2015-140361 A | 8/2015 |
| JP | 2018-145407 A | 9/2018 |
| WO | 2007/127276 A1 | 11/2007 |
| WO | 2014/010500 A1 | 1/2014 |
| WO | 2018/015461 A1 | 1/2018 |
| WO | 2018/089575 A1 | 5/2018 |
| WO | 2018/113455 A1 | 6/2018 |
| WO | WO 2020153303 * | 1/2020 |

OTHER PUBLICATIONS

Extended European Search Report dated Dec. 14, 2021 from the European Patent Office in EP Application No. 21190768.8.
International Preliminary Report on Patentability dated Jul. 27, 2021 in International Application No. PCT/JP2020/001732.
International Search Report dated Mar. 17, 2020 in International Application No. PCT/JP2020/001732.
Extended European Search Report dated Oct. 17, 2022 in European Application No. 20745899.3.
Communication dated Oct. 26, 2022, from the State Intellectual Property Office of the People's Republic of China in Application No. 202080008947.0.

* cited by examiner

Primary Examiner — Jeffrey C Mullis
(74) Attorney, Agent, or Firm — Sughrue Mion, PLLC

(57) ABSTRACT

An object of this invention is to provide a resin composition usable as a modifier with which the brittleness of a plastic material including a plurality of resins, such as a laminate of different kinds of materials collected for recycling, can be overcome and the impact resistance and elongation at break can be enhanced. Provided is a resin composition (A) including the following components (1) and (2): (1) a composition (a1) including at least two kinds of ethylene-vinyl acetate copolymers having different vinyl acetate contents; and (2) a copolymer (a2) that is at least one copolymer selected from an ethylene-acrylic acid copolymer and an ethylene-methacrylic acid copolymer.

15 Claims, No Drawings

RESIN COMPOSITION, MODIFIER, AND RESIN COMPOSITION INCLUDING THE MODIFIER

This Nonprovisional application claims priority under 35 U.S.C. § 119 on Patent Application No. 2020-137634 filed in Japan on Aug. 17, 2020, the entire contents of which are hereby incorporated by reference.

TECHNICAL FIELD

The present invention relates to a resin composition and a molded article made of the resin composition.

BACKGROUND ART

In recent years, concern with the problems of environmental pollution by plastic has been growing, and material recycling of plastic products is promoted. In many cases, material recycling of plastic is carried out by melting collected plastic wastes and then returning them to pellets usable as a raw material or by regenerating them into consumable materials such as a palette. In this regard, in a case where collected plastic wastes containing different kinds of plastic are subjected to recycling, the physical properties of recycled plastic may be deteriorated due to poor compatibility between the different kinds of plastic, disadvantageously. In order to deal with this, currently, collected plastic wastes are sorted by material types, and are then regenerated into products.

However, multi-layered films and multi-layered containers constituted by a laminate of different kinds of plastic are difficult to be separated from each other according to the materials, and therefore cannot be recycled. Thus, such multi-layered films and such multi-layered containers are disposed of by reclamation or incineration.

In such circumstances, addition of a compatibilizer is considered as one method for recycling a layered composite resin. For example, it is considered to use an ionomer resin as a compatibilizer to carry out composite recycling of PE-PET and PP-ABS (Patent Literature 1). For another example, it is considered to use an oxazoline-based compatibilizer to carry out composite recycling of, e.g., PE-PET (Patent Literature 2). Composite recycling of PE-EVOH is also considered (Patent Literature 3). These literatures indicate that addition of the compatibilizer can enhance the physical properties of a composite of PE and PET, EVOH, or the like.

CITATION LIST

Patent Literature

[Patent Literature 1]
Japanese Patent Application Publication Tokukai No. 2001-220473
[Patent Literature 2]
Japanese Patent Application Publication Tokukai No. 2004-182957
[Patent Literature 3]
Published Japanese Translation of PCT International Application Tokuhyo No. 2009-535452

SUMMARY OF INVENTION

Technical Problem

However, recycled resins obtained by these methods do not have sufficient mechanical characteristics. As such, it is necessary to develop a technique that can provide a further improvement in the mechanical characteristics. In addition, the recycled resins have disadvantages of increased viscosity, yellowing, odors, and/or the like, and thus have poor repeated recyclability and are limited on their usages.

In view of these disadvantages, the present invention was made. An aspect of the present invention has an object to provide a resin composition usable as a modifier with which the brittleness of a plastic material including a plurality of resins, such as a laminate of different kinds of materials collected for recycling, can be overcome and the impact resistance and elongation at break can be enhanced.

Solution to Problem

The inventors of the present invention made diligent studies to attain the object. As a result, the inventors of the present invention found that a resin composition including (a) two kinds of ethylene-vinyl acetate copolymers having different vinyl acetate contents and (b) a resin composition including at least one copolymer selected from an ethylene-acrylic acid copolymer and an ethylene-methacrylic acid copolymer is suitably usable as a resin modifier that can enhance the impact resistance and elongation at break in a brittle material made of a plurality of resin components. Consequently, the inventors of the present invention completed the present invention.

That is, the present invention is a resin composition (A) including the following components (1) and (2):

(1) A composition (a1) including at least two kinds of ethylene-vinyl acetate copolymers having different vinyl acetate contents.

(2) A copolymer (a2) that is at least one copolymer selected from an ethylene-acrylic acid copolymer and an ethylene-methacrylic acid copolymer.

Advantageous Effects of Invention

According to the present invention, it is possible to provide a resin composition which has an excellent modifying effect in terms of impact resistance and elongation at break and which is usable as a modifier for a molded resin article that is required to have these physical properties. Particularly, use of the resin composition enables effective material recycling of a plastic waste including a plurality of resins.

DESCRIPTION OF EMBODIMENTS

The following will provide a detailed description of a resin composition (A) in accordance with an aspect of the present invention.

A resin composition (A) in accordance with this aspect contains a composition (a1) including at least two kinds of ethylene-vinyl acetate copolymers having different vinyl acetate contents (hereinafter, such a composition will be referred to as an "EVA composition (a1)").

Each of the ethylene-vinyl acetate copolymers in the EVA composition (a1) preferably has a vinyl acetate content of not less than 5 wt % and not more than 85 wt %. The vinyl acetate content can be measured in accordance with the method defined in JIS K6924-1.

A method for producing the ethylene-vinyl acetate copolymer may be, e.g., a known production method, such as high-pressure radical polymerization, solution polymerization, or emulsion polymerization. Such a resin can be appropriately selected from commercially-available products, examples of which encompass Ultrathene (product name) available from Tosoh Corporation and Levapren (product name) and Levamelt (product name) each available from Lanxess K.K.

In the EVA composition (a1), a difference in vinyl acetate content taken between the ethylene-vinyl acetate copolymers in each pair is not less than 1 wt %, more preferably not less than 5 wt %. With this, in a case where the resin composition (A) is blended as a modifier in the thermoplastic resin (B), the compatibility therebetween is further enhanced, and consequently the impact resistance and elongation at break of a composition to be obtained are enhanced.

In a case where a difference in vinyl acetate content is taken between the copolymers in the EVA composition (a1), a difference in vinyl acetate content in at least one pair of copolymers is preferably not more than 40 wt %. This enhances the compatibility between the ethylene-vinyl acetate copolymers constituting the resin composition (A). Consequently, in a case where such a resin composition (A) is blended as a modifier in the thermoplastic resin (B), the impact resistance and elongation at break of the thermoplastic resin (B) are further improved. The difference in vinyl acetate content in at least one pair of copolymers is preferably not more than 30 wt %, further preferably not more than 20 wt %, most preferably not more than 15 wt %.

Here, the difference in vinyl acetate content taken between the copolymers in the EVA composition (a1) can be calculated as below, assuming that, for example, the copolymers are three kinds of ethylene-vinyl acetate copolymers respectively having vinyl acetate contents of 25 wt %, 50 wt %, and 80 wt % (hereinafter, these vinyl acetate contents will be respectively expressed as VAc25, VAc50, and VAc80).

$VAc50-VAc25=25$ wt %

$VAc80-VAc50=30$ wt %

$VAc80-VAc25=55$ wt %

The EVA composition (a1) preferably includes at least three kinds of ethylene-vinyl acetate copolymers having different vinyl acetate contents.

This can be satisfied by blending, as the ethylene-vinyl acetate copolymers constituting the EVA composition (a1), two or more kinds of ethylene-vinyl acetate copolymers, preferably three or more kinds of ethylene-vinyl acetate copolymers. Such an EVA composition can be expressed as, e.g., (VAc15+VAc25), (VAc25+VAc40), (VAc25+VAc50), (VAc50+VAc80), (VAc15+VAc25+VAc50), (VAc25+VAc50+VAc80), (VAc15+VAc25+VAc50+VAc70), (VAc15+VAc25+VAc50+VAc80), and (VAc15+VAc25+VAc50+VAc70+VAc80), where "VAcN" denotes an ethylene-vinyl acetate copolymer having a vinyl acetate content of N wt % (N is a positive number smaller than 100) and composition of the components is expressed with (+).

The resin composition (A) in accordance with this aspect contains a copolymer (a2) that is at least one copolymer selected from an ethylene-acrylic acid copolymer and an ethylene-methacrylic acid copolymer (hereinafter, such a copolymer will be referred to as a "copolymer (a2)"). In one aspect, the copolymer (a2) is at least one copolymer that is the ethylene-acrylic acid copolymer or the ethylene-methacrylic acid copolymer.

An acrylic acid content or a methacrylic acid content in the copolymer (a2) is preferably not less than 3 mol % and not more than 15 mol %. In a case where the copolymer (a2) includes both the ethylene-acrylic acid copolymer and the ethylene-methacrylic acid copolymer, the total of the acrylic acid content and the methacrylic acid content is preferably not less than 3 mol % and not more than 15 mol %.

The copolymer (a2) may include one kind of copolymer or two or more kinds of copolymers. Here, the aspect in which the copolymer (a2) includes two or more kinds of copolymers refers to (i) an aspect in which the copolymer (a2) includes two or more kinds of ethylene-acrylic acid copolymers, (ii) an aspect in which the copolymer (a2) includes two or more kinds of ethylene-methacrylic acid copolymers, and (iii) an aspect in which the copolymer (a2) includes both an ethylene-acrylic acid copolymer and an ethylene-methacrylic acid copolymer. In the aspect (iii), the ethylene-acrylic acid copolymer may be one kind of ethylene-acrylic acid copolymer or two or more kinds of ethylene-acrylic acid copolymers, and the ethylene-methacrylic acid copolymer may be one kind of ethylene-methacrylic acid copolymer or two or more kinds of ethylene-methacrylic acid copolymers.

In the resin composition (A) in accordance with this aspect, an absolute value of a difference between a solubility parameter (hereinafter, referred to as a "SP value") of at least one ethylene-vinyl acetate copolymer contained in the EVA composition (a1) and a solubility parameter of the copolymer (a2) is preferably not more than 0.3 MPa, the solubility parameters being calculated according to Fedors method (Polym. Eng. Sci., 14, 147 (1974)). This enhances the compatibility between the ethylene-vinyl acetate copolymer composition (a1) and the copolymer (a2) in the resin composition (A), thereby improving the impact resistance and elongation at break of a composition to be obtained.

In a case where the resin composition (A) includes two or more kinds of copolymers (a2), it is only necessary that a relation between at least one ethylene-vinyl acetate copolymer constituting the EVA composition (a1) and any of the copolymers (a2) satisfies the above condition. It is further preferable that a relation between at least one ethylene-vinyl acetate copolymer constituting the EVA composition (a1) and each of the copolymers (a2) satisfies the above condition.

Here, the SP values of the components are calculated according to Fedors method. For example, with regard to four kinds of ethylene-vinyl acetate copolymers respectively having vinyl acetate contents of 15 wt %, 25 wt %, 50 wt %, and 80 wt %, an ethylene-acrylic acid copolymer having an acrylic acid content of 20 wt % (=9 mol %), and an ethylene-methacrylic acid copolymer having a methacrylic acid content of 11 wt % (=4 mol %), the SP values can be calculated as below.

Ethylene-vinyl acetate copolymer having a vinyl acetate content of 15 wt %=18.0 MPa.

Ethylene-vinyl acetate copolymer having a vinyl acetate content of 25 wt %=18.3 MPa.

Ethylene-vinyl acetate copolymer having a vinyl acetate content of 50 wt %=19.3 MPa.

Ethylene-vinyl acetate copolymer having a vinyl acetate content of 80 wt %=20.6 MPa.

Ethylene-methacrylic acid copolymer having a methacrylic acid content of 4 mol %=18.2 MPa.

Ethylene-acrylic acid copolymer having an acrylic acid content of 9 mol %=19.2 MPa.

For example, assume a case where the resin composition (A) includes, as the copolymer (a2), an ethylene-methacrylic acid copolymer (SP value=18.2 MPa) having a methacrylic acid content of 4 mol %. In this case, in order to satisfy the condition that the absolute value of the difference between the SP values of at least one ethylene-vinyl acetate copolymer constituting the EVA composition (a1) and the copolymer (a2) should be not more than 0.3 MPa, it is only necessary to select at least the ethylene-vinyl acetate copolymer (18.3 MPa) having a vinyl acetate content of 25 wt %. Similarly, assume another case where the resin composition (A) includes, as the copolymer (a2), an ethylene-acrylic acid copolymer (19.2 MPa) having an acrylic acid content of 9 mol %. In this case, in order to satisfy the condition that the absolute value of the difference between the SP values of at least one ethylene-vinyl acetate copolymer constituting the EVA composition (a1) and the copolymer (a2) should be not more than 0.3 MPa, it is only necessary to select at least the ethylene-vinyl acetate copolymer (19.3 MPa) having a vinyl acetate content of 50 wt %.

In the resin composition (A) in accordance with this aspect, a mixture ratio between the EVA composition (a1) and the copolymer (a2) is preferably set such that the resin composition (A) contains the EVA composition (a1) in an amount of not less than 50 wt % and not more than 99 wt % and the copolymer (a2) in an amount of not less than 1 wt % and not more than 50 wt %, where the total of (a1) and (a2) is 100 wt %. Preferably, the mixture ratio is set such that the resin composition (A) contains the EVA composition (a1) in an amount of not less than 70 wt % and not more than 90 wt % and the copolymer (a2) in an amount of not less than 10 wt % and not more than 30 wt %, where the total of (a1) and (a2) is 100 wt %. Setting the content of the EVA composition (a1) so as to fall within a range of not less than 50 wt % and not more than 99 wt % can further enhance the compatibility between the blended resins and the impact resistance. Meanwhile, setting the content of the copolymer (a2) so as to fall within a range of not less than 1 wt % and not more than 50 wt % can further enhance the compatibility between the blended resins.

The following will provide a detailed description of a modifier in accordance with an aspect of the present invention.

In this aspect, the modifier includes the resin composition (A) (hereinafter, such a modifier will be referred to as a "modifier in accordance with this aspect").

The resin composition (A) in accordance with this aspect may be blended, as a modifier, in a resin that is a basic material. This can enhance the impact resistance of the resin. In addition, in a case where the basic material to be blended is made of a resin containing a plurality of components, addition of the resin composition (A) in accordance with this aspect can enhance the compatibility between the components.

The modifier in accordance with this aspect can be used in any form, e.g., in pellet form or powdery form.

The basic material (hereinafter, referred to as a "thermoplastic resin (B)") to which the modifier in accordance with this aspect is to be blended is preferably at least one kind selected from the group consisting of polyolefin-based resins, acrylic acid-based resins, polyamide-based resins, polyester-based resins, polycarbonate resins, polystyrene resins, and a styrene-acrylonitrile copolymer, more preferably a composition including at least two kinds selected from this group, since such a basic material has excellent compatibility with the modifier. Note that the components of the EVA composition (a1) and the copolymer (a2) are excluded from the components of the thermoplastic resin (B).

Examples of the polyolefin-based resin encompass high-density polyethylene, low-density polyethylene, linear low-density polyethylene, polypropylene, an ethylene-propylene copolymer, an ethylene-vinyl alcohol copolymer, an ethylene-acrylic acid ester copolymer, an ethylene-methacrylic acid ester copolymer, polybutadiene, and polyisoprene.

Examples of the acrylic acid-based resin encompass poly(acrylic acid), poly(methyl acrylate), poly(ethyl acrylate), poly(butyl acrylate), poly(octyl acrylate), poly(methacrylic acid), poly(methyl methacrylate), poly(ethyl methacrylate), poly(butyl methacrylate), and poly(octyl methacrylate).

Examples of the polyamide-based resin encompass nylon 6, nylon 6,6, nylon 11, and nylon 12.

Examples of the polyester-based resin encompass polyethylene terephthalate, a glycol-modified polyethylene terephthalate resin (PETG resin), polybutylene terephthalate, polylactic acids (including poly-L-lactic acid, poly-D-lactic acid, a copolymer of L-lactic acid and D-lactic acid, and a stereo complex of poly-L-lactic acid and poly-D-lactic acid), polybutylene succinate, poly(butylene succinate/adipate), polyethylene succinate, poly(butylene succinate/terephthalate), poly(butylene adipate/terephthalate), poly(hydroxy butyrate/hydroxy hexanoate), polyglycolic acid, poly(3-hydroxy butyrate), and polycaprolactone.

Among these, a thermoplastic resin constituting the thermoplastic resin (B) is preferably at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, glycol-modified polyethylene terephthalate resin (PETG resin), polybutylene terephthalate, polylactic acid (poly-L-lactic acid, poly-D-lactic acid, a copolymer of L-lactic acid and D-lactic acid, a stereo complex of poly L-lactic acid and poly D-lactic acid), and polybutylene succinate, since blending such a thermoplastic resin (B) with the resin composition (A) leads to enhanced impact resistance and elongation at break.

The thermoplastic resin constituting the thermoplastic resin (B) is more preferably at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin (PETG resin), and polybutylene terephthalate.

The thermoplastic resin (B) may be an unused virgin resin or a resin obtained by collecting used molded articles. That is, the thermoplastic resin (B) encompasses a form in which all of one or plural kinds of resin(s) is/are an unused resin(s), a form in which at least one kind of one or plural kinds of resin(s) is a used resin(s), and a form in which all of one or plural kind(s) of resin(s) is/are a used resin(s).

In a case where the thermoplastic resin (B) employs a resin made of used molded articles having been collected, such a thermoplastic resin (B) may sometimes include plural kinds of resins. In this case, the thermoplastic resin (B) may include, as an organic impurit(ies), a polyvinyl chloride resin, a wax, an adhesive, a plasticizer, an antioxidant, and/or the like. Meanwhile, the thermoplastic resin (B) may include an inorganic impurity such as a filler.

The mixture ratio between the resin composition (A) and the thermoplastic resin (B) is preferably set such that the thermoplastic resin (B) is contained in an amount of not less than 50 wt % and not more than 99 wt % and the resin composition (A) is contained in an amount of not less than 1 wt % and not more than 50 wt %. A resin composition produced to contain the thermoplastic resin (B) in an amount of not more than 99 wt % achieves excellent impact resistance. Meanwhile, a resin composition produced to contain the thermoplastic resin (B) in an amount of not less than 50 wt % achieves excellent rigidity. More preferably, the resin composition contains the thermoplastic resin (B) in an amount of not less than 60 wt % and not more than 95 wt % and the resin composition (A) in an amount of not less than 5 wt % and not more than 40 wt %, even more preferably the thermoplastic resin (B) in an amount of not less than 70 wt % and not more than 95 wt % and the resin composition (A) in an amount of not less than 5 wt % and not more than 30 wt %.

In a case where the modifier in accordance with this aspect is blended in the thermoplastic resin (B), it is possible to employ the production method including the kneading step of kneading the modifier and the thermoplastic resin (B). This makes it possible to produce a resin composition (C) in which the modifier is blended in the thermoplastic resin (B).

Examples of the kneading method encompass a method of kneading, at once, the modifier and various materials constituting the thermoplastic resin (B) with use of a kneader and a method of kneading the modifier alone in advance, blending the kneaded modifier in the thermoplastic resin (B), and further kneading a resulting mixture. The latter method can mix the modifier with the thermoplastic resin (B) more uniformly, and accordingly can more stably give desired physical properties. Therefore, the latter method is preferable.

The kneader is not limited to any particular one, provided that it can uniformly disperse the components. The kneading can be carried out with use of a generally-used kneader for resins. Examples of the kneader encompass a single-screw extruder, a twin-screw extruder, a multi-screw extruder, a Banbury mixer, a pressure kneader, a roll kneader, and an internal mixer. Among these, the twin-screw extruder is more preferable, since the twin-screw extruder is excellent in dispersing performance and continuous productivity.

In a case where the kneading is carried out with the twin-screw extruder, the screw speed of the twin-screw extruder is not limited to any particular one. Preferably, the kneading is carried out at a screw speed of not lower than 50 rpm and not higher than 3000 rpm, more preferably not lower than 300 rpm and not higher than 3000 rpm. Setting the screw speed so as to be not lower than 50 rpm is preferable, since this can improve the dispersibility of the mixed components and thus can provide a resin having favorable physical properties. Meanwhile, setting the screw speed so as to be not higher than 3000 rpm is preferable, since this can avoid deterioration of a resin that might otherwise occur due to excessive shear heat generation and thus can provide a resin having favorable physical properties.

In a case where the extruder is used in the kneading step, it is possible to use, as a raw material, a resin composition obtained through kneading carried out with the extruder, preferably a resin composition obtained through kneading carried out under a high-speed shearing condition of not lower than 50 rpm and not higher than 3000 rpm. Alternatively, a molded product obtained through extrusion molding carried out with the extruder as it is can be used as a molded article.

The kneading temperature is preferably in a range from a melting point of a component having the lowest melting point among the component(s) of the thermoplastic resin (B) to approximately 300° C. In a case where the thermoplastic resin (B) is an amorphous resin, the kneading temperature is preferably in a range from a glass-transition temperature to approximately 300° C.

The following will provide a detailed description of a resin composition (C) containing the resin composition (A) in accordance with an aspect of the present invention and the thermoplastic resin (B).

The resin composition (C) in accordance with this aspect contains the resin composition (A) and the thermoplastic resin (B). That is, the resin composition (C) is synonymous with a product obtained by blending, in the thermoplastic resin (B), the modifier in accordance with this aspect.

The composition in accordance with this aspect may contain an antistatic agent, a light stabilizer, an ultraviolet absorber, a nucleating agent, a lubricant, an antioxidant, an antiblocking agent, a fluidity improving agent, a mold release agent, a flame retarder, a coloring agent, an inorganic neutralizer, a hydrochloric acid absorbent, a filler conductive agent, a chain length extension agent, a hydrolysis inhibitor, and/or the like, within a range with which the effects of the present invention are not impaired.

In a case where the resin composition (C) in accordance with this aspect contains a component(s) other than the resin composition (A) and the thermoplastic resin (B), the content of the other component(s) can be expressed as an added amount with respect to 100 parts by weight of the sum of (A) and (B). In other words, the expression "weight %" for (A) and (B) is used to express a ratio between (A) and (B), and a percentage of the other component(s) can be defined separately.

The resin composition (C) in accordance with this aspect can be used in any form, e.g., in pellet form or powdery form.

The method for molding the resin composition (C) in accordance with this aspect may be selected arbitrarily. Examples of the molding method encompass contour extrusion, a film, a sheet, blowing, injection, foaming, extrusion coating, and rotational molding.

A molded article made of the resin composition (C) in accordance with this aspect is applicable to various usages, such as automobile parts, housings of electric and electronic parts, building materials, civil construction members, agricultural materials, containers, package materials, adhesives, and daily necessaries.

EXAMPLES

The following will describe the present invention with reference to Examples and Comparative Examples. However, the present invention is not limited to them.
(1) Melt Mass-Flow Rate (MFR)

The MFRs of an ethylene-vinyl acetate copolymer, an ethylene-acrylic acid copolymer, an ethylene-methacrylic acid copolymer, and a thermoplastic resin (B) were measured with a melt indexer (available from Takara Kougyou) under conditions of a temperature of 190° C. and a load of 2.16 kg.
(2) Vinyl Acetate Content The vinyl acetate amount was measured in accordance with JIS K6924-1.
(3) SP Value The SP values of the ethylene-vinyl acetate copolymer, the ethylene-acrylic acid copolymer, and the ethylene-methacrylic acid copolymer were calculated according to Fedors method.
(4) Impact Resistance The impact resistance was measured in accordance with JIS P 8134. A sheet having a thickness of 0.1 mm obtained by press-molding was subjected to measurement involving use of a film impact tester (available from Toyo Seiki, Co.

Ltd., FT-M), carried out by striking with a hammer having a hemispheric head at a test capacity of 3 J.

(5) Tensile Test

A sheet having a thickness of 0.1 mm obtained by press-molding was punched into a dumbbell-shaped test piece in accordance with ASTM D-1822-L. The test piece had a size with a total length of 63.5 mm, a parallel-part length of 9.53 mm, a parallel-part width of 3.18 mm, a thickness of 0.1 mm, and a grip-part width of 9.53 mm. The test piece was subjected to measurement involving use of a Tensilon tensile tester (available from Orientec Co. Ltd., RTE-1210) carried out under conditions of a distance between chucks of 30 mm and a tension rate of 200 mm/min. A point at which the sample was broken was obtained as elongation at break (elongation at break [%]=tensile length required for breakage [mm]/distance between chucks of 30 mm), and the stress applied at that time was obtained as a stress at break.

Example 1

As the resin composition (A), a resin composition having the following composition was used.
[Resin Composition (A)]
 65 wt % of an ethylene-vinyl acetate copolymer (a1-25) (available from Tosoh Corporation, product name: Ultrathene 640) having a vinyl acetate content of 25 wt % and a melt mass-flow rate of 3 g/10 minutes.
 10 wt % of an ethylene-vinyl acetate copolymer (a1-50) (available from Lanxess K.K., product name: Levapren 500) having a vinyl acetate content of 50 wt % and a melt mass-flow rate of 3 g/10 minutes.
 25 wt % of an ethylene-acrylic acid copolymer (a2-9) (available from SK Global Chemical Japan, Co. Ltd., product name: SK Primacor5980I) having an acrylic acid content of 9 mol % and a melt mass-flow rate of 300 g/10 min.

The above-described resin compositions were dry-blended, and a resultant was melted and kneaded with a twin-screw extruder (available from Technovel Corporation, product name: ULTnano25TW) having a screw diameter of 25 mm under conditions of a resin temperature of 160° C. and a screw speed of 150 rpm. As a result, pellets of a resin composition (A) were obtained.

As the thermoplastic resin (B), a thermoplastic resin composition having the following composition was used.
[Thermoplastic Resin (B) Composition]
 70 wt % of low-density polyethylene (B-1) (available from Tosoh Corporation, product name: PETROTH-ENE 205) having a melt mass-flow rate of 3 g/10 minutes and a melting point of 111° C.
 30 wt % of an ethylene-vinyl alcohol copolymer (B-4) (available from Kuraray Co. Ltd., product name: EVAL C109B) having an ethylene content of 35 mol % and a melting point of 177° C.
 80 wt % of the thermoplastic resin (B) composition and 20 wt % of the resin composition (A) were dry-blended, and a resultant was melted and kneaded with a twin-screw extruder (available from Technovel Corporation, product name: ULTnano25TW) having a screw diameter of 25 mm under conditions of a resin temperature of 200° C. and a screw speed of 300 rpm. As a result, a composition was obtained.

The composition thus obtained was press-molded with a press-molding machine (available from Shinto Metal Industries, Ltd., AWFA-50) under conditions of a pressure of 10 MPa, a heating temperature of 200° C. (primary pressuring for three minutes, secondary pressuring for three minutes), and a cooling temperature of 25° C. (four minutes) to give a press sheet having a thickness of 0.1 mm.

The press sheet thus obtained was subjected to a tensile test and an impact test. The result of the evaluation is shown in Table 1.

Example 2

As the thermoplastic resin (B), a thermoplastic resin composition having the following composition was used.
[Thermoplastic Resin (B) Composition]
 70 wt % of low-density polyethylene (B-1) (available from Tosoh Corporation, product name: PETROTH-ENE 205) having a melt mass-flow rate of 3 g/10 minutes and a melting point of 111° C.
 30 wt % of nylon 6 (B-5) (available from Ube Industries, Ltd., product name: UBE NYLON 1022D) having a melting point of 220° C.
 80 wt % of the thermoplastic resin (B) composition and 20 wt % of the resin composition (A) described in Example 1 were dry-blended, and a resultant was melted and kneaded with a twin-screw extruder (available from Technovel Corporation, product name: ULTnano25TW) having a screw diameter of 25 mm under conditions of a resin temperature of 230° C. and a screw speed of 300 rpm. As a result, a composition was obtained.

The composition thus obtained was press-molded with a press-molding machine (available from Shinto Metal Industries, Ltd., AWFA-50) under conditions of a pressure of 10 MPa, a heating temperature of 230° C. (primary pressuring for three minutes, secondary pressuring for three minutes), and a cooling temperature of 25° C. (four minutes) to give a press sheet having a thickness of 0.1 mm.

The press sheet thus obtained was subjected to a tensile test and an impact test. The result of the evaluation is shown in Table 1.

Example 3

As the thermoplastic resin (B), a thermoplastic resin composition having the following composition was used.
[Thermoplastic resin (B) composition]
 70 wt % of low-density polyethylene (B-1) (available from Tosoh Corporation, product name: PETROTH-ENE 205) having a melt mass-flow rate of 3 g/10 minutes and a melting point of 111° C.
 30 wt % of polyethylene terephthalate (B-6) (available from UNITIKA Ltd., MA-2103) having a melting point of 255° C.

The thermoplastic resin (B) composition was dry-blended, and a resultant was melted and kneaded with a twin-screw extruder (available from Technovel Corporation, product name: ULTnano25TW) having a screw diameter of 25 mm under conditions of a resin temperature of 270° C. and a screw speed of 150 rpm. As a result, pellets of the resin composition (B) were obtained.

80 wt % of the obtained thermoplastic resin (B) composition and 20 wt % of the resin composition (A) described in Example 1 were dry-blended, and a resultant was melted and kneaded with a twin-screw extruder (available from Technovel Corporation, product name: ULTnano25TW) having a screw diameter of 25 mm under conditions of a resin temperature of 230° C. and a screw speed of 300 rpm. As a result, a composition was obtained.

The composition thus obtained was press-molded with a press-molding machine (available from Shinto Metal Industries, Ltd., AWFA-50) under conditions of a pressure of 10 MPa, a heating temperature of 230° C. (primary pressuring for three minutes, secondary pressuring for three minutes), and a cooling temperature of 25° C. (four minutes) to give a press sheet having a thickness of 0.1 mm.

The press sheet thus obtained was subjected to a tensile test and an impact test. The result of the evaluation is shown in Table 1.

Example 4

A press sheet was obtained by the same procedures as in Example 3 except that a thermoplastic resin composition having the following composition was used as the thermoplastic resin (B).

[Thermoplastic resin (B) composition]
- 70 wt % of low-density polyethylene (B-1) (available from Tosoh Corporation, product name: PETROTHENE 205) having a melt mass-flow rate of 3 g/10 minutes and a melting point of 111° C.
- 10 wt % of an ethylene-vinyl alcohol copolymer (B-4) (available from Kuraray Co. Ltd., product name: EVAL C109B) having an ethylene content of 35 mol % and a melting point of 177° C.
- 10 wt % of nylon 6 (B-5) (available from Ube Industries, Ltd., product name: UBE NYLON 1022D) having a melting point of 220° C.
- 10 wt % of polyethylene terephthalate (B-6) (available from UNITIKA Ltd., MA-2103) having a melting point of 255° C.

The press sheet thus obtained was subjected to a tensile test and an impact test. The result of the evaluation is shown in Table 1.

Example 5

A press sheet was obtained by the same procedures as in Example 1 except that a resin composition having the following composition was used as the resin composition (A).

[Resin Composition (A)]
- 33 wt % of an ethylene-vinyl acetate copolymer (a1-15) (available from Tosoh Corporation, product name: Ultrathene 626) having a vinyl acetate content of 15 wt % and a melt mass-flow rate of 3 g/10 minutes.
- 32 wt % of an ethylene-vinyl acetate copolymer (a1-25) (available from Tosoh Corporation, product name: Ultrathene 640) having a vinyl acetate content of 25 wt % and a melt mass-flow rate of 3 g/10 minutes.
- 10 wt % of an ethylene-vinyl acetate copolymer (a1-50) (available from Lanxess K.K., product name: Levapren 500) having a vinyl acetate content of 50 wt % and a melt mass-flow rate of 3 g/10 minutes.
- 25 wt % of an ethylene-acrylic acid copolymer (a2-9) (available from SK Global Chemical Japan, Co. Ltd., product name: SK Primacor5980I) having an acrylic acid content of 9 mol % and a melt mass-flow rate of 300 g/10 min.

The press sheet thus obtained was subjected to a tensile test and an impact test. The result of the evaluation is shown in Table 1.

Example 6

A press sheet was obtained by the same procedures as in Example 2 except that a resin composition described in Example 5 was used as the resin composition (A).

The press sheet thus obtained was subjected to a tensile test and an impact test. The result of the evaluation is shown in Table 1.

Example 7

A press sheet was obtained by the same procedures as in Example 3 except that a resin composition described in Example 5 was used as the resin composition (A).

The press sheet thus obtained was subjected to a tensile test and an impact test. The result of the evaluation is shown in Table 1.

Example 8

A press sheet was obtained by the same procedures as in Example 4 except that a resin composition described in Example 5 was used as the resin composition (A).

The press sheet thus obtained was subjected to a tensile test and an impact test. The result of the evaluation is shown in Table 1.

TABLE 1

| | Resin | | VAc (%) | SP value (MPa) | Example 1 | 2 | 3 | 4 | 5 | 6 | 7 | 8 |
|---|---|---|---|---|---|---|---|---|---|---|---|---|
| Resin composition (A) | EVA composition (a1) | a1-15 | 15 | 18.0 | — | — | — | — | 33 | 33 | 33 | 33 |
| | | a1-25 | 25 | 18.3 | 65 | 65 | 65 | 65 | 32 | 32 | 32 | 32 |
| | | a1-50 | 50 | 19.3 | 10 | 10 | 10 | 10 | 10 | 10 | 10 | 10 |
| | | a1-80 | 80 | 20.6 | — | — | — | — | — | — | — | — |
| | Copolymer (a2) | a2-4 | — | 18.2 | — | — | — | — | — | — | — | — |
| | | a2-9 | — | 19.2 | 25 | 25 | 25 | 25 | 25 | 25 | 25 | 25 |
| Thermoplastic resin (B) | LDPE | B-1 | — | — | 70 | 70 | 70 | 70 | 70 | 70 | 70 | 70 |
| | LLDPE | B-2 | — | — | — | — | — | — | — | — | — | — |
| | HDPE | B-3 | — | — | — | — | — | — | — | — | — | — |
| | EVOH | B-4 | — | — | 30 | — | — | 10 | 30 | — | — | 10 |
| | PA | B-5 | — | — | — | 30 | — | 10 | — | 30 | — | 10 |
| | PET | B-6 | — | — | — | — | 30 | 10 | — | — | 30 | 10 |
| Blend ratio | | (B)/(A) | | | 80/20 | 80/20 | 80/20 | 80/20 | 80/20 | 80/20 | 80/20 | 80/20 |
| Properties | Impact resistance (kJ/m) | | | | 2.5 | 4 | 5 | 4 | 3 | 5 | 8 | 5 |
| | Tensile elongation at break (%) | | | | 70 | 150 | 30 | 90 | 90 | 175 | 40 | 100 |
| | Tensile stress at break (MPa) | | | | 10.2 | 14.5 | 10.5 | 11.3 | 10.5 | 15.1 | 11.8 | 12.3 |

Example 9

A press sheet was obtained by the same procedures as in Example 8 except that the amount of the thermoplastic resin (B) was changed to 90 wt % and the amount of the resin composition (A) was changed to 10 wt %.

The press sheet thus obtained was subjected to a tensile test and an impact test. The result of the evaluation is shown in Table 2.

Example 10

A press sheet was obtained by the same procedures as in Example 8 except that the amount of the thermoplastic resin (B) was changed to 95 wt % and the amount of the resin composition (A) was changed to 5 wt %.

The press sheet thus obtained was subjected to a tensile test and an impact test. The result of the evaluation is shown in Table 2.

Example 11

A press sheet was obtained by the same procedures as in Example 4 except that a resin composition having the following composition was used as the resin composition (A).

[Resin composition (A)]
- 25 wt % of an ethylene-vinyl acetate copolymer (a1-15) (available from Tosoh Corporation, product name: Ultrathene 626) having a vinyl acetate content of 15 wt % and a melt mass-flow rate of 3 g/10 minutes.
- 25 wt % of an ethylene-vinyl acetate copolymer (a1-25) (available from Tosoh Corporation, product name: Ultrathene 640) having a vinyl acetate content of 25 wt % and a melt mass-flow rate of 3 g/10 minutes.
- 10 wt % of an ethylene-vinyl acetate copolymer (a1-50) (available from Lanxess K.K., product name: Levapren 500) having a vinyl acetate content of 50 wt % and a melt mass-flow rate of 3 g/10 minutes.
- 40 wt % of an ethylene-acrylic acid copolymer (a2-9) (available from SK Global Chemical Japan, Co. Ltd., product name: SK Primacor5980I) having an acrylic acid content of 9 mol % and a melt mass-flow rate of 300 g/10 min.

The press sheet thus obtained was subjected to a tensile test and an impact test. The result of the evaluation is shown in Table 2.

Example 12

A press sheet was obtained by the same procedures as in Example 4 except that a resin composition having the following composition was used as the resin composition (A).

[Resin Composition (A)]
- 33 wt % of an ethylene-vinyl acetate copolymer (a1-15) (available from Tosoh Corporation, product name: Ultrathene 626) having a vinyl acetate content of 15 wt % and a melt mass-flow rate of 3 g/10 minutes.
- 32 wt % of an ethylene-vinyl acetate copolymer (a1-25) (available from Tosoh Corporation, product name: Ultrathene 640) having a vinyl acetate content of 25 wt % and a melt mass-flow rate of 3 g/10 minutes.
- 10 wt % of an ethylene-vinyl acetate copolymer (a1-50) (available from Lanxess K.K., product name: Levapren 500) having a vinyl acetate content of 50 wt % and a melt mass-flow rate of 3 g/10 minutes.
- 25 wt % of an ethylene-methacrylic acid copolymer (a2-4) (available from DOW-MITSUI POLYCHEMICALS Co. Ltd., product name: NUCREL 1108C) having a methacrylic acid content of 4 mol % and a melt mass-flow rate of 10 g/10 minutes.

The press sheet thus obtained was subjected to a tensile test and an impact test. The result of the evaluation is shown in Table 2.

Example 13

A press sheet was obtained by the same procedures as in Example 4 except that a resin composition having the following composition was used as the resin composition (A).

[Resin composition (A)]
- 23 wt % of an ethylene-vinyl acetate copolymer (a1-15) (available from Tosoh Corporation, product name: Ultrathene 626) having a vinyl acetate content of 15 wt % and a melt mass-flow rate of 3 g/10 minutes.
- 22 wt % of an ethylene-vinyl acetate copolymer (a1-25) (available from Tosoh Corporation, product name: Ultrathene 640) having a vinyl acetate content of 25 wt % and a melt mass-flow rate of 3 g/10 minutes.
- 10 wt % of an ethylene-vinyl acetate copolymer (a1-50) (available from Lanxess K.K., product name: Levapren 500) having a vinyl acetate content of 50 wt % and a melt mass-flow rate of 3 g/10 minutes.
- 20 wt % of an ethylene-vinyl acetate copolymer (a1-80) (available from Lanxess K.K., product name: Levapren 800) having a vinyl acetate content of 80 wt % and a melt mass-flow rate of 5 g/10 minutes.
- 25 wt % of an ethylene-acrylic acid copolymer (a2-9) (available from SK Global Chemical Japan, Co. Ltd., product name: SK Primacor5980I) having an acrylic acid content of 9 mol % and a melt mass-flow rate of 300 g/10 min.

The press sheet thus obtained was subjected to a tensile test and an impact test. The result of the evaluation is shown in Table 2.

Example 14

A press sheet was obtained by the same procedures as in Example 8 except that a thermoplastic resin composition having the following composition was used as the thermoplastic resin (B).

[Thermoplastic Resin (B) Composition]
- 70 wt % of a linear low-density polyethylene (B-2) (available from Tosoh Corporation, product name: NIPOLON-L F15R) having a melt mass-flow rate of 0.8 g/10 minutes and a melting point of 122° C.
- 10 wt % of an ethylene-vinyl alcohol copolymer (B-4) (available from Kuraray Co. Ltd., product name: EVAL C109B) having an ethylene content of 35 mol % and a melting point of 177° C.
- 10 wt % of nylon 6 (B-5) (available from Ube Industries, Ltd., product name: UBE NYLON 1022D) having a melting point of 220° C.
- 10 wt % of polyethylene terephthalate (B-6) (available from UNITIKA Ltd., MA-2103) having a melting point of 255° C.

The press sheet thus obtained was subjected to a tensile test and an impact test. The result of the evaluation is shown in Table 2.

Example 15

A press sheet was obtained by the same procedures as in Example 8 except that a thermoplastic resin composition having the following composition was used as the thermoplastic resin (B).

[Thermoplastic Resin (B) Composition]
- 70 wt % of high-density polyethylene (B-3) (available from Tosoh Corporation, product name: Nipolon Hard 4020) having a melt mass-flow rate of 5.5 g/10 minutes and a melting point of 133° C.
- 10 wt % of an ethylene-vinyl alcohol copolymer (B-4) (available from Kuraray Co. Ltd., product name: EVAL C109B) having an ethylene content of 35 mol % and a melting point of 177° C.
- 10 wt % of nylon 6 (B-5) (available from Ube Industries, Ltd., product name: UBE NYLON 1022D) having a melting point of 220° C.
- 10 wt % of polyethylene terephthalate (B-6) (available from UNITIKA Ltd., MA-2103) having a melting point of 255° C.

The press sheet thus obtained was subjected to a tensile test and an impact test. The result of the evaluation is shown in Table 2.

Comparative Example 2

A press sheet was obtained by the same procedures as in Example 2 except that the resin composition (A) was not blended and only the following thermoplastic resin (B) composition was used.

[Thermoplastic Resin (B) Composition]
- 70 wt % of low-density polyethylene (B-1) (available from Tosoh Corporation, product name: PETROTHENE 205) having a melt mass-flow rate of 3 g/10 minutes and a melting point of 111° C.
- 30 wt % of nylon 6 (B-5) (available from Ube Industries, Ltd., product name: UBE NYLON 1022D) having a melting point of 220° C.

The press sheet thus obtained was subjected to a tensile test and an impact test. The result of the evaluation is shown in Table 3.

Comparative Example 3

A press sheet was obtained by the same procedures as in Example 3 except that the resin composition (A) was not blended and only the following thermoplastic resin (B) composition was used.

TABLE 2

| | Resin | | VAc (%) | SP value (MPa) | Example 9 | 10 | 11 | 12 | 13 | 14 | 15 |
|---|---|---|---|---|---|---|---|---|---|---|---|
| Resin composition (A) | EVA composition (a1) | a1-15 | 15 | 18.0 | 33 | 33 | 25 | 33 | 23 | 33 | 33 |
| | | a1-25 | 25 | 18.3 | 32 | 32 | 25 | 32 | 22 | 32 | 32 |
| | | a1-50 | 50 | 19.3 | 10 | 10 | 10 | 10 | 10 | 10 | 10 |
| | | a1-80 | 80 | 20.6 | — | — | — | — | 20 | — | — |
| | Copolymer (a2) | a2-4 | — | 18.2 | — | — | — | 25 | — | — | — |
| | | a2-9 | — | 19.2 | 25 | 25 | 40 | — | 25 | 25 | 25 |
| Thermoplastic resin (B) | LDPE | B-1 | — | — | 70 | 70 | 70 | 70 | 70 | — | — |
| | LLDPE | B-2 | — | — | — | — | — | — | — | 70 | — |
| | HDPE | B-3 | — | — | — | — | — | — | — | — | 70 |
| | EVOH | B-4 | — | — | 10 | 10 | 10 | 10 | 10 | 10 | 10 |
| | PA | B-5 | — | — | 10 | 10 | 10 | 10 | 10 | 10 | 10 |
| | PET | B-6 | — | — | 10 | 10 | 10 | 10 | 10 | 10 | 10 |
| Blend ratio | (B)/(A) | | | | 90/10 | 95/5 | 80/20 | 80/20 | 80/20 | 80/20 | 80/20 |
| Properties | Impact resistance (kJ/m) | | | | 4 | 3 | 5 | 4 | 6 | 6 | 5 |
| | Tensile elongation at break (%) | | | | 90 | 75 | 110 | 90 | 120 | 300 | 70 |
| | Tensile stress at break (MPa) | | | | 12.6 | 12.9 | 12.2 | 12.5 | 11.8 | 10.4 | 15.1 |

Comparative Example 1

A press sheet was obtained by the same procedures as in Example 1 except that the resin composition (A) was not blended and only the following thermoplastic resin (B) composition was used.

[Thermoplastic Resin (B) Composition]
- 70 wt % of low-density polyethylene (B-1) (available from Tosoh Corporation, product name: PETROTHENE 205) having a melt mass-flow rate of 3 g/10 minutes and a melting point of 111° C.
- 30 wt % of an ethylene-vinyl alcohol copolymer (B-4) (available from Kuraray Co. Ltd., product name: EVAL C109B) having an ethylene content of 35 mol % and a melting point of 177° C.

The press sheet thus obtained was subjected to a tensile test and an impact test. The result of the evaluation is shown in Table 3.

[Thermoplastic Resin (B) Composition]
- 70 wt % of low-density polyethylene (B-1) (available from Tosoh Corporation, product name: PETROTHENE 205) having a melt mass-flow rate of 3 g/10 minutes and a melting point of 111° C.
- 30 wt % of polyethylene terephthalate (B-6) (available from UNITIKA Ltd., MA-2103) having a melting point of 255° C.

The press sheet thus obtained was subjected to a tensile test and an impact test. The result of the evaluation is shown in Table 3.

Comparative Example 4

A press sheet was obtained by the same procedures as in Example 4 except that the resin composition (A) was not blended and only the following thermoplastic resin (B) composition was used.

[Thermoplastic Resin (B) Composition]
- 70 wt % of low-density polyethylene (B-1) (available from Tosoh Corporation, product name: PETROTH- ENE 205) having a melt mass-flow rate of 3 g/10 minutes and a melting point of 111° C.

10 wt % of an ethylene-vinyl alcohol copolymer (B-4) (available from Kuraray Co. Ltd., product name: EVAL C109B) having an ethylene content of 35 mol % and a melting point of 177° C.

10 wt % of nylon 6 (B-5) (available from Ube Industries, Ltd., product name: UBE NYLON 1022D) having a melting point of 220° C.

10 wt % of polyethylene terephthalate (B-6) (available from UNITIKA Ltd., MA-2103) having a melting point of 255° C.

The press sheet thus obtained was subjected to a tensile test and an impact test. The result of the evaluation is shown in Table 3.

Comparative Example 5

A press sheet was obtained by the same procedures as in Example 4 except that a resin composition having the following composition was used as the resin composition (A).

[Resin Composition (A)]

65 wt % of an ethylene-vinyl acetate copolymer (a1-15) (available from Tosoh Corporation, product name: Ultrathene 626) having a vinyl acetate content of 15 wt % and a melt mass-flow rate of 3 g/10 minutes.

35 wt % of an ethylene-vinyl acetate copolymer (a1-80) (available from Lanxess K.K., product name: Levapren 800) having a vinyl acetate content of 80 wt % and a melt mass-flow rate of 5 g/10 minutes.

The press sheet thus obtained was subjected to a tensile test and an impact test. The result of the evaluation is shown in Table 3.

Comparative Example 6

A press sheet was obtained by the same procedures as in Example 4 except that a resin composition having the following composition was used as the resin composition (A).

[Resin Composition (A)]

75 wt % of an ethylene-vinyl acetate copolymer (a1-15) (available from Tosoh Corporation, product name: Ultrathene 626) having a vinyl acetate content of 15 wt % and a melt mass-flow rate of 3 g/10 minutes.

25 wt % of an ethylene-acrylic acid copolymer (a2-9) (available from SK Global Chemical Japan, Co. Ltd., product name: SK Primacor5980I) having an acrylic acid content of 9 mol % and a melt mass-flow rate of 300 g/10 minutes.

The press sheet thus obtained was subjected to a tensile test and an impact test. The result of the evaluation is shown in Table 3.

TABLE 3

| | Resin | | VAc (%) | SP value (MPa) | Comparative Example 1 | 2 | 3 | 4 | 5 | 6 |
|---|---|---|---|---|---|---|---|---|---|---|
| Resin composition (A) | EVA composition (a1) | a1-15 | 15 | 18.0 | — | — | — | — | 65 | 75 |
| | | a1-25 | 25 | 18.3 | — | — | — | — | — | — |
| | | a1-50 | 50 | 19.3 | — | — | — | — | — | — |
| | | a1-80 | 80 | 20.6 | — | — | — | — | 35 | — |
| | Copolymer (a2) | a2-4 | — | 18.2 | — | — | — | — | — | — |
| | | a2-9 | — | 19.2 | — | — | — | — | — | 25 |
| Thermoplastic resin (B) | LDPE | B-1 | — | — | 70 | 70 | 70 | 70 | 70 | 70 |
| | LLDPE | B-2 | — | — | — | — | — | — | — | — |
| | HDPE | B-3 | — | — | — | — | — | — | — | — |
| | EVOH | B-4 | — | — | 30 | — | — | 10 | 10 | 10 |
| | PA | B-5 | — | — | — | 30 | — | 10 | 10 | 10 |
| | PET | B-6 | — | — | — | — | 30 | 10 | 10 | 10 |
| Blend ratio | | (B)/(A) | | | 100/0 | 100/0 | 100/0 | 100/0 | 80/20 | 80/20 |
| Properties | | Impact resistance (kJ/m) | | | 0.6 | 0.7 | 0.7 | 0.5 | 1.5 | 1.2 |
| | | Tensile elongation at break (%) | | | 6 | 9 | 7 | 3 | 30 | 25 |
| | | Tensile stress at break (MPa) | | | 12.7 | 10.3 | 14.1 | 13.2 | 9.5 | 10.8 |

The invention claimed is:

1. A resin composition (A) comprising the following components (1) and (2):
    (1) a composition (a1) including at least two kinds of ethylene-vinyl acetate copolymers having different vinyl acetate contents; and
    (2) a copolymer (a2) that is at least one copolymer selected from an ethylene-acrylic acid copolymer and an ethylene-methacrylic acid copolymer,
    wherein an absolute value of a difference between a solubility parameter of one of the ethylene-vinyl acetate copolymers in the composition (a1) and a solubility parameter of the ethylene-acrylic acid copolymer or the ethylene-methacrylic acid copolymer in the copolymer (a2) is not more than 0.3 MPa, the solubility parameters being calculated according to Fedors method.

2. The resin composition (A) as set forth in claim 1, wherein
    the resin composition (A) contains the composition (a1) in an amount of not less than 50 wt % and not more than 99 wt % and the copolymer (a2) in an amount of not less than 1 wt % and not more than 50 wt %, a total of the composition (a1) and the copolymer (a2) being 100 wt %.

3. The resin composition (A) as set forth in claim 1, wherein
    the copolymer (a2) has an acrylic acid content or a methacrylic acid content of not less than 3 mol % and not more than 15 mol %.

4. The resin composition (A) as set forth in claim 1, wherein
    the composition (a1) is a composition including three or more kinds of ethylene-vinyl acetate copolymers having different vinyl acetate contents.

5. The resin composition (A) as set forth in claim 1, wherein
in a case where a difference in vinyl acetate content is taken between the copolymers in the composition (a1), a difference in vinyl acetate content in each pair of copolymers in the composition (a1) is not more than 40 wt %.

6. A modifier comprising the resin composition (A) recited in claim 1, the modifier making at least two kinds of resins compatible with each other.

7. A resin composition (C) comprising the resin composition (A) recited in claim 1 in an amount of not less than 1 wt % and not more than 50 wt % and a thermoplastic resin (B) in an amount of not less than 50 wt % and not more than 99 wt %, a total of the resin composition (A) and the thermoplastic resin (B) being 100 wt %.

8. The resin composition (C) as set forth in claim 7, wherein
the thermoplastic resin (B) includes at least one kind selected from the group consisting of polyolefin, polyester, an acrylic resin, polyamide, polycarbonate, polystyrene, and a styrene-acrylonitrile copolymer.

9. The resin composition (C) as set forth in claim 7, wherein
the thermoplastic resin (B) is at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin, polybutylene terephthalate, polylactic acids including poly-L-lactic acid, poly-D-lactic acid, a copolymer of L-lactic acid and D-lactic acid, and a stereo complex of poly-L-lactic acid and poly-D-lactic acid, and polybutylene succinate.

10. The resin composition (C) as set forth in claim 9, wherein
the thermoplastic resin (B) is at least one kind selected from the group consisting of high-density polyethylene, low-density polyethylene, linear low-density polyethylene, polypropylene, an ethylene-propylene copolymer, an ethylene-vinyl alcohol copolymer, nylon 6, nylon 6,6, nylon 11, nylon 12, polyethylene terephthalate, a glycol-modified polyethylene terephthalate resin, and polybutylene terephthalate.

11. The resin composition (C) as set forth in claim 7, wherein
the thermoplastic resin (B) includes at least two or more kinds of resins.

12. The resin composition (C) as set forth in claim 7, wherein
the thermoplastic resin (B) is made of a used molded article.

13. A method for producing a resin composition (C) comprising the resin composition (A) recited in claim 1 in an amount of not less than 1 wt % and not more than 50 wt % and a thermoplastic resin (B) in an amount of not less than 50 wt % and not more than 99 wt %, a total of the resin composition (A) and the thermoplastic resin (B) being 100 wt %, the method comprising a step of kneading the thermoplastic resin (B) and a modifier comprising the resin composition (A) recited in claim 1 with a twin-screw extruder, the modifier making at least two kinds of resins compatible with each other.

14. The method as set forth in claim 13, wherein
the step of kneading is carried out with the twin-screw extruder at a screw speed of not lower than 50 rpm and not higher than 3000 rpm.

15. A molded product produced by forming the resin composition (C) recited in claim 7.

* * * * *